United States Patent [19]
Carini

[11] Patent Number: 5,740,443
[45] Date of Patent: Apr. 14, 1998

[54] CALL-SITE SPECIFIC SELECTIVE AUTOMATIC INLINING

[75] Inventor: Paul Robert Carini, Sherman, Conn.

[73] Assignee: International Business Machines Corporation, Armonk, N.Y.

[21] Appl. No.: 514,544

[22] Filed: Aug. 14, 1995

[51] Int. Cl.$^6$ ......................................................... G06F 9/45
[52] U.S. Cl. ............................................. 395/705; 395/709
[58] Field of Search ................................... 395/700, 705, 395/709

[56] References Cited

U.S. PATENT DOCUMENTS

| | | | |
|---|---|---|---|
| 5,175,856 | 12/1992 | Van Dyke et al. | 395/700 |
| 5,230,050 | 7/1993 | Iitsuka et al. | 395/700 |
| 5,539,907 | 7/1996 | Srivastova et al. | 395/700 |

OTHER PUBLICATIONS

F. E. Allen et al., "A Catalogue of Optimizing Transformations", Prentice–Hall, Inc., chapter 1, pp. 1–30, (1972).

J. W. Davidson et al., "A Study of a C Function Inliner", Software–Practice and Experience, 18(8), pp. 775–790, Aug. 1988.

S. Richardson et al., "Interprocedural Analysis Vs. Procedure Integration". Information Processing Letters, 137–142, Aug. 1989.

W. –M. Hwu et al., "Inline Function Expansion for Compiling C Programs", SIGPLAN '89, Conf. on Programming Language Design and Implementation, vol. 24, pp. 246–255, Jun. 1989.

J. W. Davidson et al., "Subprogram Inlining: A Study of its Effects on Program Execution Time", IEEE Transactions on Software Engineering, vol. 18, No. 2, pp. 89–102, Feb. 1992.

K.D. Cooper et al., "Unexpected Side Effects of Inline Substitution: A Case Study", ACM Letters on Programming Languages and Systems, vol. 1, No. 1, pp. 22–32, Mar. 1992.

P. P. Chang et al., "Profile–guided Automatic Inline Expansion for C Programs", Software–Practice and Experience, vol. 22(5), pp. 349–369 (May 1992).

T. J. Marlowe, "Data Flow Analysis and Incremental Iteration", Rutgers University (Oct. 1989).

A. V. Aho et al., "Compilers: Principles, Techniques, and Tools", Addison–Wesley Publishing Co., pp. 602–604, (1986).

J. P. Banning, "An Efficient Way to Find the Side Effects of Procedure Calls and the Aliases of Variables", Sixth Annual ACM Sym. on Principles of Programming Languages, 29–41, Jan. 1979.

K. D. Cooper et al., "Interprocedural Side–Effect Analysis in Linear Time", SIGPLAN '88 Conference on Programming Language Design and Implementation, 57–66, (Jun. 1988).

*Primary Examiner*—Thomas M. Heckler
*Assistant Examiner*—Kakali Chaki
*Attorney, Agent, or Firm*—Kevin M. Jordan

[57] ABSTRACT

A compiler implemented method performs call-site specific selective automatic procedure integration over a program call graph. Individual call sites are selected for inlining based on two cost functions without the need for profiling. A routine cost function models each procedure and attempts to capture the cost of inlining a procedure. A call site cost function models the region around each call site, and attempts to capture the benefit of inlining or cloning a particular call site. Inlining is performed only at call sites for which both the routine cost function is less than a first threshold value and the call site cost function is less than a second threshold value.

27 Claims, 5 Drawing Sheets

CALL-SITE SPECIFIC SELECTIVE AUTOMATIC INLINING

CROSS-REFERENCE TO RELATED APPLICATIONS

The present application is related in subject matter to U.S. application Ser. No. 08/490,879 filed Jun. 15, 1995, by Paul R. Carini et al; Ser. No. 08/135,199 filed Oct. 12, 1993, now U.S. Pat. No. 5,485,616 by M. Burke et al; and Ser. No. 08/139,484 filed Oct. 20, 1993 by M. Burke et al., now abandoned, commonly assigned to the assignee of the present application, which U.S. applications are hereby incorporated herein by reference in their entirety.

BACKGROUND OF THE INVENTION

1. Field of the Invention

The present invention generally relates to a system and method for efficiently handling compiler optimization problems and, more particularly, to a system and method for performing call site specific selective automatic inlining.

2. Background Description

Program analysis has struggled with the tradeoff between modularization and optimization in many forms. The division of a program into small, modular, procedures is an effective and accepted programming technique that provides many benefits but which also introduces additional execution overhead. The popularity of object-oriented languages, such as C++, accelerates this trend to smaller procedures, in order to facilitate reuse.

One well known technique for reducing the penalty incurred by writing modular programs is procedure integration, which is also known as inline expansion, or inlining. Inlining is a well known compile-time optimization that can substantially improve the execution performance of programs by replacing a procedure call with the body of the called procedure. Allen and Cocke listed inline substitution as a linkage optimization in *Design and Optimization of a Compiler*, chapter 1, pages 1–30, Prentice-Hall, Inc., 1972. See also Jack W. Davidson and Anne M. Holler, A Study of a C Function Inliner. *Software—Practice and Experience*, 18(8):775–790, August 1988, which introduced an automatic source to source inliner that inlined procedures within the same source file. A study of interprocedural analysis versus procedure integration is shown by Stephen Richardson and Mahadevan Ganapathi, *Information Processing Letters*, 32(3):137–142, August 1989. Wen mei W. Hwu and Pohua P. Chang consider inline Function Expansion for Compiling C Programs in SIGPLAN '89 *Conference on Programming Language Design and Implementation*, volume 24, pages 246–255, June 1989. SIGPLAN Notices 24(6).

The increasing popularity of object-oriented languages, such as C++, accelerates the trend toward programs created from smaller and more numerous procedures and provides even greater opportunities for inlining to improve execution performance.

Inlining provides performance improvements for three principal reasons. First, the procedure linkage is removed, including the code to save and restore registers, allocate stack space, and the branch itself. Second, the code surrounding the call site can be improved, since the call itself, which is usually a barrier for many optimizations, is no longer present. By removing the call site it is also possible to perform better instruction scheduling, register allocation, etc. Third, the procedure code that is substituted for the call can be optimized for the specific call context. Some simplifications may also result from optimizations such as unreachable code elimination or invariant if removal, when the arguments at this call site are propagated into the callee code. In practice, inlining is not always beneficial and may degrade the execution performance of some programs. See e.g., Jack W. Davidson and Anne M. Holler. Subprogram Inlining: A Study of its Effects on Program Execution Time, *IEEE Transactions on Software Engineering*, 18(2):89–102, February 1992. See also Keith D. Cooper, Mary W. Hall, and Linda Torczon. An experiment with inline substitution. *Software— Practice and Experience*, 21(6):581–601, June 1991. Inlining may also increase binary code size and compilation time. Thus, inlining cannot be performed indiscriminately.

Compilers typically provide inlining function via two different paradigms, user directed inline expansion, or userinline mode, and compiler directed, automatic inline expansion, or autoinline mode. Userinline mode requires that the user or programmer specify which procedures should be inlined. The compiler then attempts to inline the procedure at each of its call sites. Userinline mode typically requires repeated cycles of compilation and execution, as different sets of procedures are selected for inlining and the resulting execution performance measured. Profiling information can aid this process by identifying likely candidates for inlining. The attainment of peak performance with userinline mode usually requires considerable programmer time and effort.

In autoinline mode, the compiler determines which procedures should be inlined. Autoinline mode is more convenient for the user since it typically requires no more than a compile time switch. However, simple implementations which use a single characteristic, such as procedure size or nesting level, have not been able to match the performance that can be obtained with userinline mode. For example, the commercially available KAP preprocessor from Kuck and Associates (KAI) provides a form of source to source automatic inlining. However, procedures to be inlined are specified by the user in order to obtain the best performance on the SPECfp92 benchmarks on the IBM RS6000 risc machine with the xlf Fortran compiler. The VAST source inlining preprocessor from Pacific Sierra (PSR) is also used in userinline mode to obtain the best performance on the SPECfp92 benchmarks.

Another approach to improve the effectiveness of automatic inline expansion relies on profiling information to select the call sites which should be inlined. See e.g., Pohua P. Chang, Scott A. Mahlke, William Y. Chen, and Wen mei W. Hwu, Profile-guided Automatic Inline Expansion for C Programs, *Software—Practice and Experience*, 22(5):349–369, May 1992. Profiling information can be used to obtain performance from autoinline mode which is equivalent to userinline mode but is less convenient for the user. The use of profiling information typically requires at least two compilations of the program, one compilation which is executed to generate the profiling information, and the other which is used to perform the automatic inlining. The performance improvement obtained with profiling based automatic inlining may also be sensitive to the input data set that was used to generate the profiling information.

Figure 1:
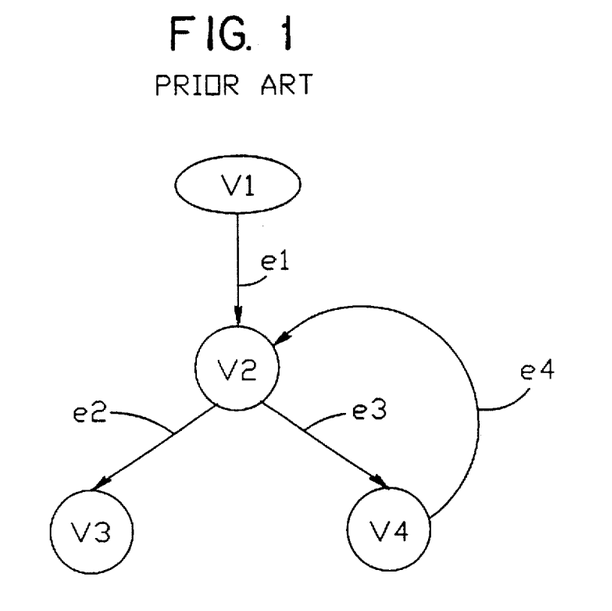
FIG. 1 is a prior art example of a flow graph.
Figure 2:
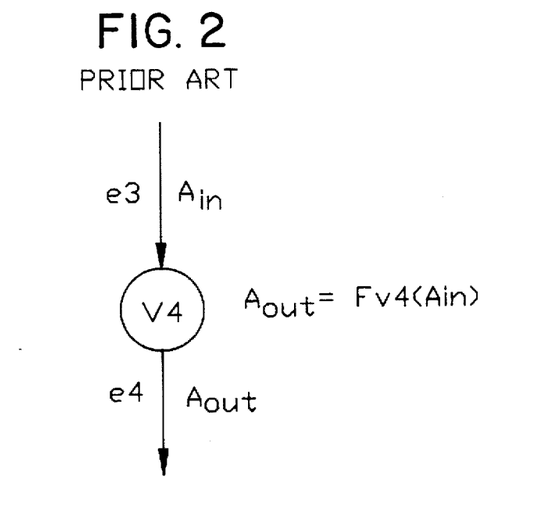
FIG. 2 is a prior art example of a transfer function.

The prior art discloses the use by optimizing and parallelizing compilers of data flow analysis which is also used by the present invention. Software development environments also utilize data flow analysis. The input to data flow analysis is a data flow framework as described in Marlowe, *Data Flow Analysis and Incremental Iteration*, Rutgers University (October 1989). The data flow framework includes a flow graph and a formal basis for describing the behavior and interaction of flow graph nodes (FIG. 1). The behavior of each node is formalized by its transfer function (FIG. 2), which describes how a node affects the solution as a function of the behavior of other nodes. When considered as a whole, the node transfer functions present a set of simultaneous equations, whose maximum fixed point (MFP) global evaluation provides the best computable solution at all edges or nodes of the flow graph. In other words, all other correct solutions are either incompatible or not as precise.

A data flow framework D is defined in terms of three components. That is, D=<FG, L,F>, where a flow graph FG=(V,E,r) is a finite set E of edges that includes a distinguished entry node r (shown as node V1 in FIG. 1), and a finite set E of edges (shown as e1, e2, e3, and e4 in FIG. 1). An edge is an ordered pair (v,w) of nodes; v is the source of the edge and w its target. For example, in FIG. 1, V1, V2, V3, and V4 are nodes with V1 being the start node r. The set of edges, E, comprise e1, e2, e3, and e4. The source of e2 is V2 and its target is V3. The edges are designated by their respective ordered pair of source and target nodes, i.e., (v,w), therefore, e1=(V1, V2); e2=(V2, V3); e3=(V2, V4); and e4=(V4, V2). Where the edge (v,w) is in E, we say that v is a predecessor of w and w a successor of v. For example, in FIG. 1, V2 is a predecessor of V3 and of V4, and also a successor of V4. A sequence of edges (V1, V2),(V2, V3), . . .,(V(n−1), Vn) in FG is a path from V1 to Vn. For example, in FIG. 1, e1, e2 is a path from V1 to V3 and e3, e4, e2 is a path from V2 to V3. If there is a path from Vi to Vj, we say that Vi reaches Vj or that Vj is reachable from Vi. Every node in FG is reachable from r, and r is not the target node of any edge in E. A cycle is a path for which V1=Vn. For example, in FIG. 1, the path e3, e4 forms a cycle. In the presence of flow graph cycles, forward topological order is defined by the removal of back edges. A back edge, as defined by Alfred V. Aho, Ravi Sethi and Jeffrey D. Ullman, *Compilers: Principles, Techniques, and Tools*, published by Addison-Wesley Publishing Co. (1986), at pages 602–604, are edges whose heads (targets) dominate their tails (sources). In FIG. 1, V2 is the head and V4 is the tail of edge e4, and the head (target) V2 dominates the tail (source) V4. Thus, e4 is a back edge.

A "meet semilattice" is a set of elements and a partial ordering of those elements which is defined by a "meet" ($\cap$) operator. More specifically, the meet semilattice L=<A, TOP, BOTTOM, <, $\cap$>, where A is a set whose elements form the domain of the data flow problem (i.e., the inputs and outputs associated with the flow graph nodes), TOP and BOTTOM are distinguished elements of $\forall$ (symbolizing the best and the worst possible solution to the optimization problem, respectively.) < is a reflexive partial order, and $\cap$ is the associative and commutative "meet" operator, such that for any a,b in A, $$a<b<=>a \cap b=a$$

$$a \cap a=a$$

$$a \cap b<a$$

$$a \cap TOP=a$$

$$a \cap BOTTOM=BOTTOM$$

Where the elements of the domain are sets, examples of meet operators are intersection and union. Where the operator is union, TOP would typically be the empty set and BOTTOM the universal set. Where the operator is intersection, TOP would typically be the universal set and BOTTOM the empty set. Intuitively, higher points in the lattice correspond to higher degrees of information.

The input and output to a node Y are elements of A. A transfer function (FIG. 2) operates on the input to a node Y to determine the output of the node Y. More specifically, F is a set of transfer functions such that F is a subset of {f: A←A}. That is, any function in F has A as its domain and its range. This set includes the identity function I (which, applied to the input of a node, produces output identical to the input), and the set is closed under composition and meet. The data flow effect of node Y is described by its transfer function $f_Y$ in F. The local properties of Y are captured by its transfer function: $OUT_Y=f_Y(IN_Y)$, where $IN_Y$ and $OUT_Y$ are in A. After a framework has been globally evaluated, each node Y has a solution $OUT_Y$ that is consistent with transfer functions at every node. In general, the best computable solution for a data flow framework is the maximum fixed convergence of the equations:

$$OUT_{root}=TOP$$

$$IN_Y=\cap(\forall X \text{ in Preds}(Y))OUT_X$$

$$OUT_Y=f_Y(IN_Y)$$

where Preds(Y) is the set of predecessors of node Y. The solution to the above equations is called the Maximum Fixed Point (MFP) solution. During an evaluation, iterations over the flow graph nodes take place until all node outputs remain unchanged. During such evaluation, $IN_Y$ travels down the lattice from TOP to the element that represents the best computable solution prior to Y, regardless of the flow path taken.

In a forward data flow problem, for each node Y,$IN_Y$ is defined in terms of the predecessors of Y (as in the equations above). In a backward data flow problem, for each node Y,$IN_Y$ is defined in terms of the successors of Y. A data flow problem which is either forward or backward is unidirectional. A data flow problem for which $IN_Y$ for each node Y depends on both the predecessors and successors of Y is bidirectional.

The prior art describes a program in terms of a general program model that is also used by this disclosure. This program model consists of a set of one or more external procedures, where an external procedure is one that is not contained (declared) within another procedure but may contain internal procedures nested within it. One of the external procedures is the main procedure. Recursion is allowed; that is, a procedure may directly or indirectly invoke itself.

The containment relationships among the procedures in a program P may be represented as a forest of trees $F_P$, where the nodes of the trees represent procedures/routines. For each external procedure/routine, there is a tree in $F_P$ whose root node represents the external procedure/routine. The variables declared directly within a procedure/routine are local to the procedure/routine, while the variables declared in the ancestors of a procedure/routine in $F_P$ are global to it. The set of variables global to procedure P is denoted GLOBAL(P). Among the local variables of a procedure P are zero or more formal parameters. The set of such variables in P is denoted FORMAL(P). A variable that is either local or global with respect to a procedure P is known to P. An external variable is one that is global to all the procedures of a program. The local variables of a procedure are visible to it; its global variables that are not hidden from it are also visible. The specific mechanism for hiding is irrelevant to our method. One mechanism provided for hiding a global variable is the declaration of a local variable of the same name in an internal procedure.

The prior art includes a model for procedural interaction which is also used in this disclosure. In the model, a statement in a program that invokes a procedure is referred to as a call site. It designates a called procedure, which must he visible to the procedure containing the call site (the calling procedure). For each formal parameter of the called procedure, the call site must designate an argument that is associated with it. An argument may be a reference argument, which is a variable that is visible to the calling procedure and is passed-by-reference to its corresponding formal parameter. When the call site is invoked, a formal parameter that is associated with a reference argument assumes the same address in memory as the argument. Procedures interact at call sites through reference arguments and also through variables that are global to the called procedure. Thus, a call site s is said to pass a variable X to a variable Y if and only if variable r is the same variable as X and is global to the called procedure, or X is passed-by reference to Y.

Figure 3:
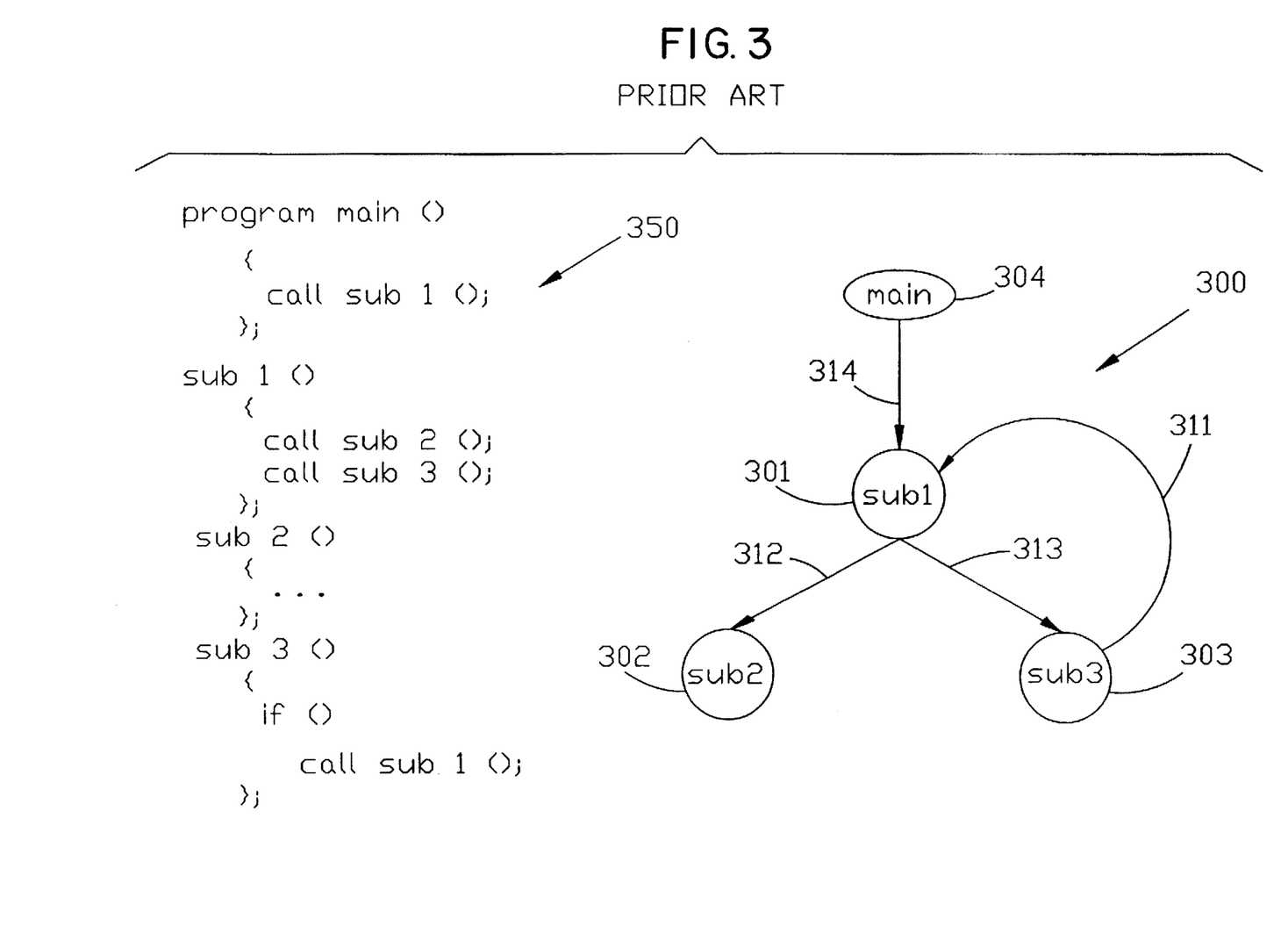
FIG. 3 is a prior art example of a program call graph.

See FIG. 3. The interprocedural structure of a program 350 is represented by a Program Call Graph (PCG) 300, a flow graph for which each procedure is uniquely represented by a single node (301-304) and each call site by a unique edge (311-314). The start node 304 represents the main procedure. The node representing a given procedure/routine P shall be referred to as node P. The edge (P,Q) represents a call site in P that invokes Q. By the definition of a flow graph, it is assumed that every node in the call graph is reachable from the main procedure 304.

In the presence of procedure calls, data flow analysis must make worst case assumptions about the data flow effect of the call unless the analysis is interprocedural; i.e., is performed across procedure boundaries. Worst-case assumptions about interprocedural information inhibit program transformations for optimization or parallelization. Interprocedural data flow analysis algorithms have been developed for various interprocedural problems (Banning, J., "An efficient way to find the side effects of procedure calls and the aliases of variables", *Sixth Annual ACM Symposium on Principles of Programming Languages*,29–41 (January 1979); Cooper et al., *SIGPLAN '88 Conference on Programming Language Design and Implementation*, 57–66 (June 1988).

Interprocedural data flow analysis may be either flow-sensitive or flow-insensitive. A flow-sensitive analysis makes use of the intraprocedural control flow information associated with individual procedures. A flow-insensitive analysis makes no use of intraprocedural control flow information. By ignoring control flow information, such an analysis does not have to consider the possible paths through a procedure, reducing the cost of the analysis in both space and time. In general, a flow-sensitive algorithm is more precise (i.e., higher in the semilattice) but less efficient in time and space than a flow-insensitive algorithm for the same problem.

Thus, there is a long felt need for a call-site specific selective automatic inlining method which does not rely on profiling information and which provides performance equivalent to that obtained by user directed inlining. The increasing popularity of object-oriented programming languages, such as C++, and the resulting trend toward more numerous, smaller, procedures, make automatic inlining an even more important tool for compiler optimization.

SUMMARY OF THE INVENTION

It is therefore an object of the present invention to provide an automatic inlining method which provides performance equivalent to that obtained by user directed inlining with approximately the same code size and compilation time but which does not rely on profiling information. It is a further object of the present invention to provide an automatic inlining method which provides the same function as user directed inlining, but is more convenient in practice, and requires less user effort and time. It is a further object of the present invention to provide an automatic inlining method which is able to perform cross file inlining, i.e the inlining of procedures which are in different source files from the call sites that invoke them. It is a further object of the present invention to perform call site specific selective automatic inlining.

According to one embodiment of the present invention, in a computer processor executing a computer compiler, a compiler implemented method for performing selective automatic procedure integration over a program call graph (PCG), comprises the steps of:

constructing the PCG of a computer program, the PCG having a plurality of PCG nodes and PCG edges, each PCG node representing a procedure in the computer program and each PCG edge representing a call site connecting two nodes, each call site being a statement in a program that invokes a given procedure, a source node being a calling PCG node and a PCG edge having a direction from the calling node to a called node, so that an outgoing PCG edge represents a call site within said procedure and an incoming edge represents a call site invoking said procedure from within another procedure, wherein the PCG edge may further represent a back edge;

eliminating from processing any back edges of the PCG;

collecting a plurality of parameter values for use by a routine cost function which evaluates a cost of inlining each procedure, and by a call site cost function which evaluates the cost of inlining each PCG edge;

performing the following steps for each procedure in a reverse topological traversal of the PCG:

inlining each outgoing PCG edge that has been marked to be inlined;

evaluating the routine cost function which utilizes a first portion of said plurality of parameter values associated with the procedure P;

evaluating the call site cost function which utilizes a second portion of said plurality of parameter values associated with each PCG edge; and marking for inlining each incoming PCG edge for which the routine cost function is evaluated less than a first threshold value and the call site cost function is evaluated less than a second threshold value.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 4:
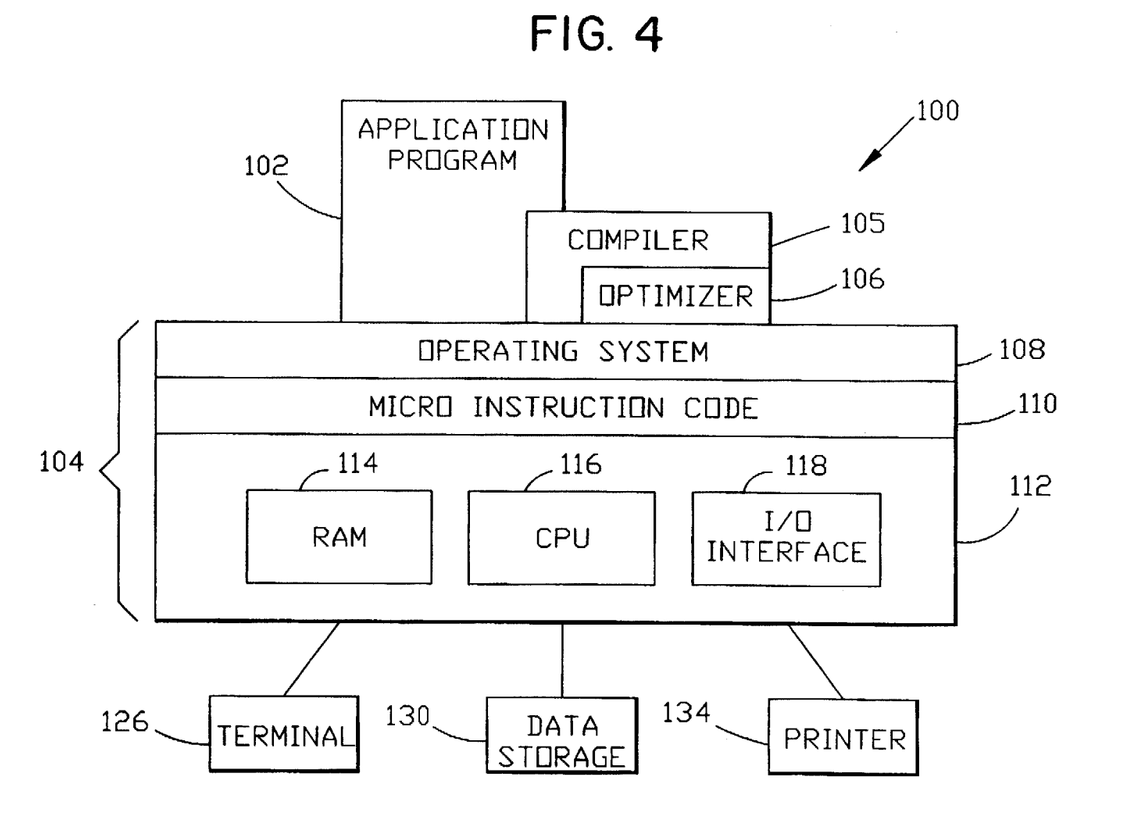
FIG. 4 is a block diagram of a preferred hardware embodiment with a compiler on which the present invention may be implemented.

Referring again to the drawings, and more particularly to FIG. 4, there is shown a block diagram of a computer system 100 on which a preferred embodiment of the present invention operates. The preferred embodiment includes one or more application programs 102. One type of application program 102 is a compiler 105 which includes an optimizer 106. The compiler 105 and optimizer 106 are configured to transform a source program (like an application program 102) into optimized executable code. More generally, the source program is transformed to an optimized form and then into executable code. A more detailed description of basic concepts of compilers is found in Aho, Sethi and Ullman, supra.

The compiler 105 and optimizer 106 operate on a computer platform 104 that includes a hardware unit 112. The hardware unit 112 includes one or more central processing units (CPU) 116, a random access memory (RAM) 114, and an input/output interface 118. Micro-instruction code 110, for instance a reduced instruction set, may also be included on the platform 104. Various peripheral components may be connected to the computer platform 104 including a terminal 126, a data storage device 130, and a printing device 134. An operating system 108 coordinates the operation of the various components or the computer system 100. An example of computer system 100 like this is the IBM RISC System/6000 (RISC System/6000 is a trademark of the IBM Corporation). It is readily understood that those skilled in the computer arts will be familiar with many equivalent computer systems 100.

The compiler 105 adapted according to the invention may support a full range of interprocedural analyses and transformations. Automatic inlining and cloning can be performed with or without interprocedural analysis ('IPA'). Many of the underlying mechanisms that were developed to support the IPA phase may also be used in the autoinline mode. Preferably, both intra-file and inter-file (cross-file) inlining and cloning are supported. The compilation model is based on the separate compilation model, which first compiles source files to object files, and then links them. The interprocedural compilation model is fully compatible with automated program generators and tools, such as the UNIX make and sccs facilities. The steps in the compilation model are as follows:

1. Collect the Interprocedural Analysis (IPA) inputs.
2. Construct the program call graph (PCG).
3. Perform a reverse topological traversal of the PCG.

The compilation model provides an IPA collection phase, during which each procedure in the program is visited and the IPA inputs are collected and saved for later use. This information typically includes such items as procedure names and formal parameters, procedure call sites and arguments, global variables which are immediately modified or referenced, and an intermediate representation of the procedure. This information is stored in the object module, which is created for each source file. Also collected and saved during this phase are the inlining and cloning inputs that are used by a routine cost functions to characterize the suitability of each procedure for inlining and a call site cost function to characterize the suitability of each call site for inlining. For the routine cost function, the inputs preferably include measurements of the size of the procedure, complexity, number of calls, and number of I/O calls, for each procedure. For the call site cost function, the inputs preferably include the size of the region containing the call, the loop nesting level of the call, the number of conditionals along the path to the call, and whether or not any of the parameters of the call are used in loop bounds, array bounds, or conditional statements of the called procedure.

After the complete program has been visited, (the model includes a provision for handling missing procedures), the interprocedural phase begins by constructing the program call graph (PCG). Each procedure is visited, the inlining inputs are collected, and an intermediate representation is generated, during the compilation phase of the separate compilation model. Cross file inlining and cloning, which may introduce cross file dependencies, are successfully handled by our compilation model. The interprocedural phase of our model is equivalent to the link phase of the separate compilation model. Procedures can be missing for various reasons, including the compilation of an incomplete program, calls to procedures written in another language, or calls to library procedures for which only the object code is available. The interprocedural phase detects missing procedures and reports them to the programmer. A compiler option is available which instructs the interprocedural phase to ignore all missing procedures. Alternatively, the programmer can specify a list of missing procedures that should be ignored. This option can also be used by the programmer to characterize the interprocedural behavior of the missing procedures. If interprocedural analysis is selected, then it is performed in the following sequence. An interprocedural alias analysis is performed, which includes both reference parameter and pointer-induced alias analyses. See e.g., Jong-Deok Choi, Michael Burke, and Paul Carini, Efficient flow-sensitive interprocedural computation of pointer-induced aliases and side effects, In *20th Annual ACM SIGACT-SIGPLAN Symposium on the Principles of Programming Languages*, pages 232–245, January 1993; Michael Burke, Paul Carini, Jong-Deok Choi, and Michael Hind, Flow-insensitive interprocedural alias analysis in the presence of pointers, *7th Workshop on Languages and Compilers for Parallel Computing*, 1994 (Extended version published as Research Report RC 18546, IBM T. J. Watson Research Center, September, 1994). The interprocedural alias analysis is followed by a phase that includes the computation of interprocedural MOD and REF information which is implemented as a flow-insensitive traversal of the PCG. See John Banning, An efficient way to find the side effects of procedure calls and the aliases of variables, *6th Annual ACM Symposium on the Principles of Programming Languages*, pages 29–41, January 1979; see also Keith Cooper and Ken Kennedy, Efficient Computation of Flow Insensitive Interprocedural Summary Information, *SIGPLAN '84 Symposium on Compiler Construction*, volume 19, pages 247–258, June 1984. *SIGPLAN Notices* 19(6); Michael Burke, An Interval-based Approach to Exhaustive and Incremental Interprocedural Data-flow Analysis, *ACM Transactions on Programming Language and Systems*, 12(3):341–395, July 1990. This analysis relies upon the IPA inputs that were previously collected. Next, interprocedural constant propagation which is implemented as a flow-insensitive traversal of the PCG. See Paul R. Carini and Michael Hind, Flow-Sensitive Interprocedural Constant Propagation, *SIGPLAN '95 Conference on Programming Language Design and Implementation*, volume 30, pages 23–31, June 1995. *SIGPLAN Notices* 20(6). The interprocedural constant propagation consists of two separate steps: the computation of interprocedural constants; and the transformation of a program representation to reflect these constants.

The final phase of interprocedural analysis is a reverse topological traversal (backward walk) of the PCG. Note that in the presence of PCG cycles, topological order is defined by the removal of back edges. The steps of the reverse topological traversal in accordance with the present invention are as follows:

1. Inline previously selected outgoing edges.
2. Select Incoming edges for inlining or cloning.
3. Perform optimizations and transformations.
4. Generate object code.

The reverse topological traversal begins with each procedure (node) being visited once. The intermediate representation of the procedure is first restored to memory, if required. The outgoing edges (which represent calls from this procedure) are then checked and procedure inlining and cloning may be performed to eliminate these call sites. The autoinline mechanism next determines whether any of the incoming edges (which represent calls of this procedure) should be inlined.

The intermediate representation may be transformed to reflect the results of interprocedural constant propagation (flow-insensitive or flow-sensitive) and upward exposed use may be computed and saved, as disclosed in the aforementioned pending U.S. patent application by Carini et al. Other traditional analyses and transformations may also be performed. Finally, optimized object code is generated for this procedure. Note that the inline mechanism preferably will not inline calls along back edges so that the inlining of recursive calls is prevented.

Figure 5:
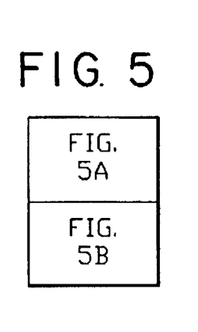
FIG. 5 is a flow chart of an embodiment of a method in accordance with the present invention.
Figure 5A:
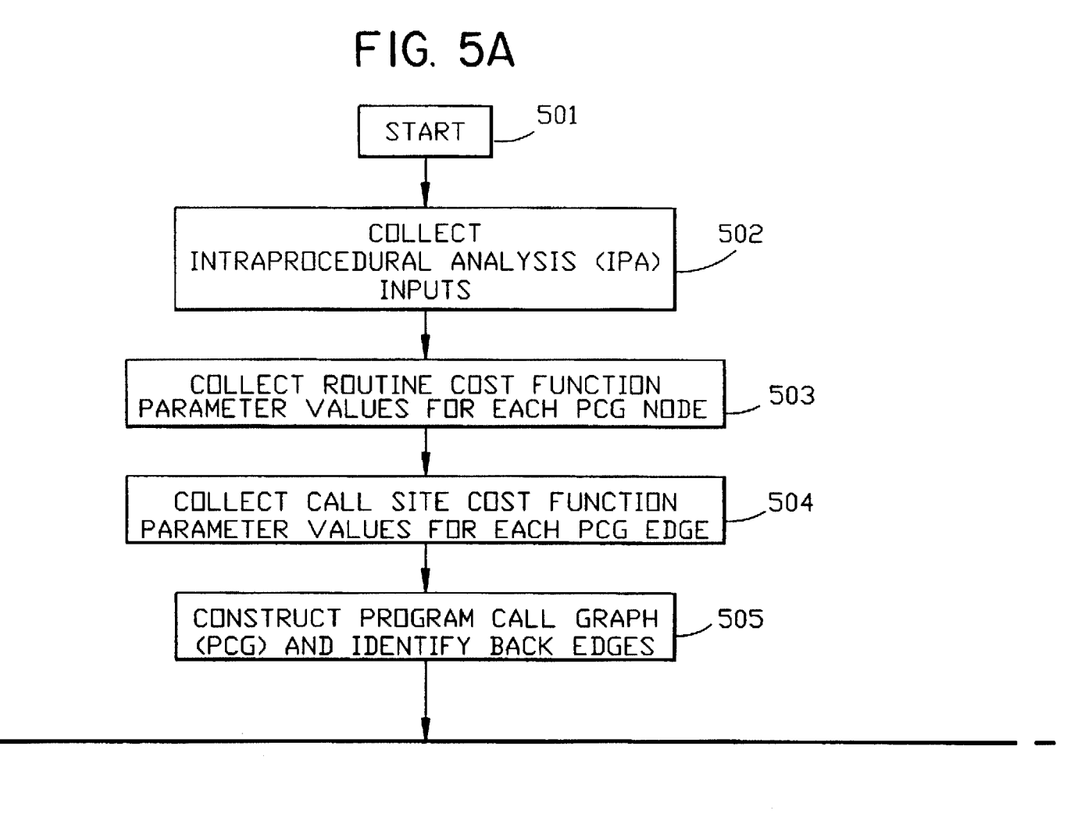
Figure 5B:
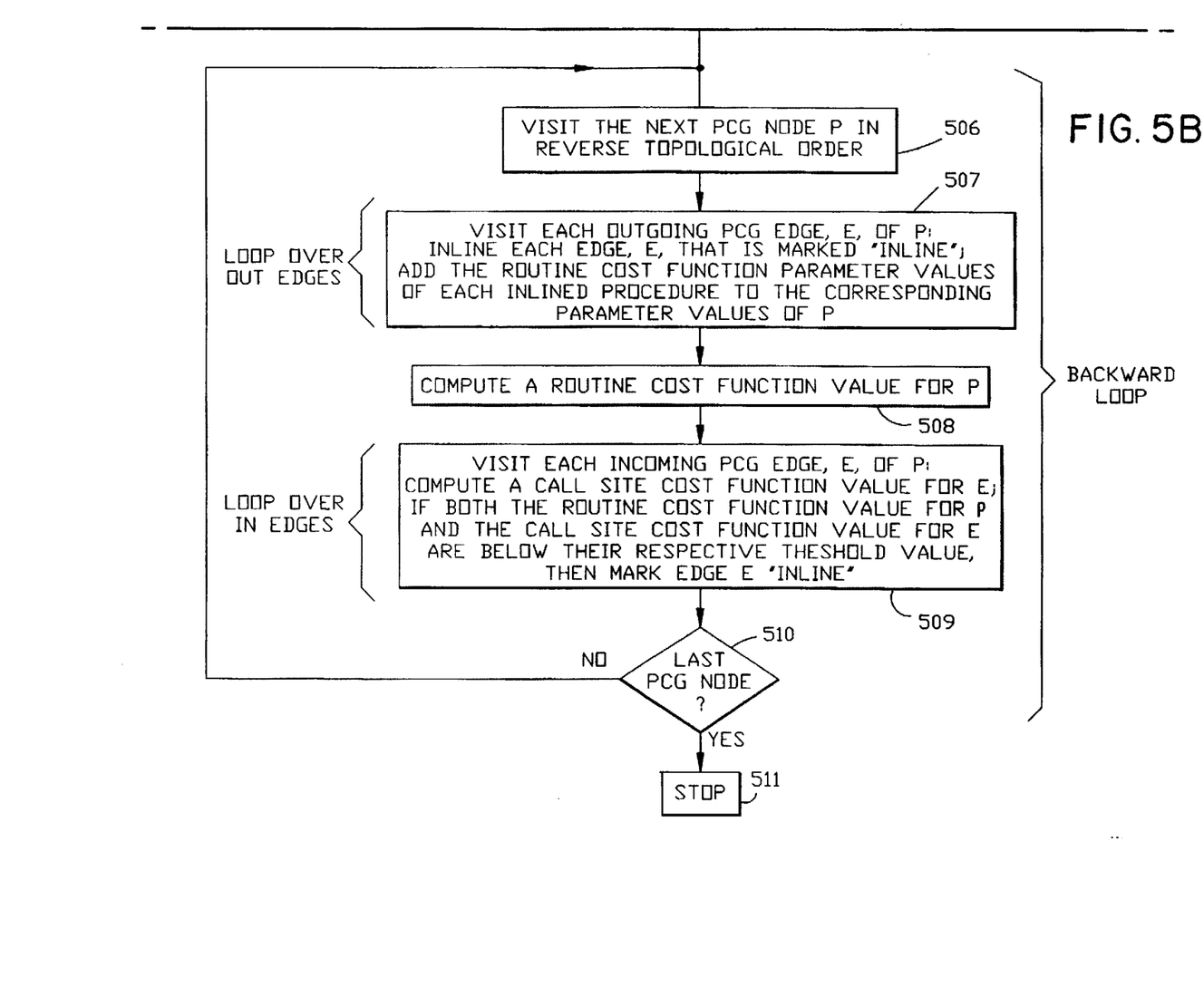

FIG. 5 is a flowchart of a method for performing selective automatic inlining in accordance with the present invention. By way of overview, and with reference to the following pseudo-code example of a procedure "auto_inline", the selective automatic inlining of the present invention is performed during the IPA backward walk. As each procedure is processed during the backward walk, the routine cost function is computed. The routine cost function determines the suitability of a particular procedure for inlining at any call site and enhances the selection of procedures which are typically short (small) and simple. On the other hand, procedures which are large or contain lots of control flow, I/O, or call sites are assigned a higher cost. Then the call site cost function is computed for each incoming edge in the PCG and a separate inlining decision is made for each call site. The call site cost function enhances the selection of call sites which are on the execution path, are deeply nested within loops, and are contained within a small region of statements. Conversely, the cost of call sites which are unlikely to be executed, or are in a large region and may potentially overflow the optimizer, are increased. Automatic inlining is performed at a call site only if both the routine cost function and the call site cost function are below their respective threshold values. This feature of the present invention makes the inlining decision call-site specific.

procedure auto_inline

Collect IPA, routine, and call site cost function inputs;
Build program call graph (PCG);
for each procedure P, in a backward topological traversal of the PCG
/* Process the call sites within p first */
    for each out edge e of P
        Inline each edge marked INLINE;
        /* adjust the cost of P to reflect the inlined procedure */
        add the routine cost inputs of the inlined procedure to P;
    end loop -continued procedure auto_inline Compute the routine_cost_function for p;
    if the routine_cost_function(p) < threshold[p] then
    /* process the call sites that invoke p */
        for each incoming edge e of P
            Compute the call_site_cost function for e;
            if the call_site_cost_function(e) < threshold[e] then
                mark edge e INLINE;
            end if
        end loop
    end if
end loop Referring again to FIG. 5, the method begins at step 501. In step 502, the IPA collection phase begins, during which each procedure in the program is visited and the IPA inputs are collected and saved for later use. As discussed previously, this information is stored in the object module, which is created for each source file. Also collected and saved during this phase are the inlining input parameters that are used by the routine and call site cost functions to characterize the suitability for inlining of each procedure and call site, respectively. For the routine cost function, the inputs preferably include measurements of the size of the procedure, complexity, number of calls, and number of I/O calls, for each procedure. For the call site cost function, the inputs preferably include the size of the region containing the call, the loop nesting level of the call, the number of conditionals along the path to the call, and whether or not any of the parameters of the call are used in loop bounds, array bounds, or conditional statements of the called procedure. In step 503, the routine cost function input parameter values are collected for each procedure (PCG node). The call site cost function input parameter values are collected, in step 504, for each PCG edge (call site). Those skilled in the art will appreciate that although the preferred method performs these collection steps during the same collection phase, this is not required, and each step can be performed separately within the spirit of the present invention. After the complete program has been visited, (the model includes a provision for handling missing procedures), the interprocedural phase begins by constructing the program call graph (PCG), in step 505.

Steps 506 through 510 form a loop. In step 506 the reverse topological traversal (backward walk) begins with each procedure (node) in the PCG being visited once and the following steps being performed for each procedure therein. Each outgoing edge, E, of each procedure, P, is visited in step 507. An outgoing edge represents a call site within P. Inlining is performed in step 507 on edges that have been marked "INLINE" and the corresponding call sites within P are removed. As each edge is inlined in step 507, the routine cost function parameter values of each inlined procedure are added to the corresponding parameter values of P. In step 508, a routine cost function value based on the previously collected routine cost function parameter values (step 503) is computed for procedure P. The routine cost function determines the suitability of a particular procedure for inlining at any call site. As will be seen in step 509, only procedures whose cost is below a threshold value are candidates for inlining. The inline routine cost is preferably computed with the following function:

$$inline\_routine\_cost = size/X1 + complexity/X2 + call\_count/X3 + iocall\_count/X4$$

As discussed previously, the routine cost function thus enhances the selection of procedures which are typically short (small) and simple. On the other hand, procedures which are large or contain lots of control flow, I/O, or call sites are assigned a higher cost. The preferred initial values for the routine cost tunable parameters X1, X2, X3, and X4 are illustrated in the following code segment:

```
/************************************************************/
/*Tunable parameters: The following defines are for tunable parameters*/
/*which drive the inlining and cloning routine and call site cost
functions*/
/************************************************************/
/*tunable parameters for inlining routine selection      */
static int X1 = 30;       /*for routine size             */
static int X2 = 8;        /*for complexity               */
static int X3 = 12;       /*for # of call sites          */
static int X4 = 1;        /*for # of io call sites       */
```

Note that all of the quantities in the formula are integers, and X1, X2, X3, and X4 are again, preferably tunable parameters. Values for the tunable parameters were chosen to maximize the execution performance of a benchmark set (to be discussed later) on a particular hardware architecture. Each parameter was varied individually as the others were kept constant to observe it effect on performance. This process was repeated until the values of the parameters stabilized. In the preferred method, the values of the tunable parameters are not changed after they have been selected. Note however, the values of the tunable parameters may vary for different hardware architectures and/or compilers.

The size, complexity, call_count, and iocall_count values are preferably all collected during the IPA collection phase for each procedure.

size is determined by counting the number of statements in the intermediate representation of the procedure. This measure favors small or short procedures by increasing the cost based on the size of the procedure.

complexity is determined by counting the number of control flow and loop statements in the procedure. Since a loop statement is a more complicated form of control flow which is likely to be repeated, it is given extra weight. In the preferred embodiment, each loop statement is counted as three control flow statements. This measure favors simple straight line procedures by increasing the cost of control flow statements, and especially loop statements.

Call_count is determined by counting the number of call sites in the procedure.

iocall_count is determined by counting the number of I/O calls in the procedure.

These measures favor procedures without call sites by increasing the cost of calls and I/O calls.

In step 509, each outgoing edge, E of each procedure, P, is visited and a call site cost function is computed for each edge, E, that is based on the previously collected call site cost function parameter values (step 504). The call site cost function governs call site selection and determines the suitability of inlining a particular call site. The call site cost function enhances the selection of call sites which are on the execution path, are deeply nested within loops, and are contained within a small region of statements. Conversely, the cost of call sites which are unlikely to be executed, or are in a large region and may potentially overflow the optimizer, are increased. As will be seen in step 509, only call sites whose cost is below a threshold value are candidates for inlining. The call site cost may be computed for each call site by the following function:

$$call\_site\_cost = block\_size/Y1 + paths/Y2 - nesting/Y3$$

Note that all of the quantifies in the formula are integers, and Y1, Y2, and Y3 are also preferably tunable parameters which may be given the values illustrated in the following code segment from the automatic inlining code.

```
/*tunable parameters for inlining call site selection    */
static int Y1 = 20;       /*for call site region         */
static int Y2 = 20;       /*for possible paths           */
static int Y3 = 1;        /*for nesting level            */
```

As for the routine cost function tunable parameters, the values for the call site cost function tunable parameters were chosen to maximize the execution performance of a benchmark set (to be discussed later). Each parameter was varied individually as the others were kept constant to observe it effect on performance. This process was repeated until the values of the parameters stabilized. In the preferred method, the values of the tunable parameters are not changed after they have been selected.

The block_size, paths, and nesting values may all be collected during the IPA input phase for each procedure.

block_size is determined by counting the number of statements in the intermediate representation which are between statements of major control flow. This measure favors a call site surrounded by a small region by increasing the cost based on the size of the region. The intent is to avoid the creation of a region which is too large to be optimized effectively.

paths is an estimate of the number of execution paths which may not traverse the call site. This is determined by counting the number of "open" conditional branches which are encountered before the call site. A conditional branch is no longer open if, for example, the THEN and ELSE bodies of a conditional IF have been passed. This measure favors call sites which are more likely to be on the execution path and could be easily improved through the use of profiling information.

nesting is determined by computing the level of loop nesting which surrounds the call site. Since the value of a call site increases with increased nesting level, this parameter is subtracted and favors nested loop call sites. Nested loop call sites are more likely to provide significant improvement due to the reduction in call overhead. A measure of the probability that a call site will be executed is determined by counting the number of control flow and loop statements in the procedure. During the IPA collection phase, interprocedural constant propagation may be used to increase the number of constant arguments within a program.

If both the routine cost function value for P and the call site function value for E are below their respective threshold value, then the edge, E, is marked "INLINE". The routine cost threshold value is preferably initialized to a value of 3 with the threshold increased by a factor of 10 for procedures that are leaf procedures or which contain formal parameters used to determine control flow within the procedure, as an array bound, or as a loop bound. The amount of the increase is preferably a tunable parameter. The call site cost threshold is preferably given an initial weight of 2 with the threshold being increased by a factor of 10 for call sites which have constant arguments that are mapped to formal parameters which are used to determine control flow within a procedure such as an array or loop bound. The threshold value is also preferably increased by a factor of 10 for call sites which are deeply nested. The amount of the increase is also preferably a tunable parameter. The thresholds were chosen to maximize the execution performance of a benchmark set (to be discussed later).

In step 510 a check is made to determine if all nodes have been processed. If not, processing continues with step 506 and the next node is selected. If all of the PCG nodes (procedures) have been processed, then the process ends in step 511. In the preferred embodiment, the routine cost function value of procedure P is examined and Step 509 is skipped if the routine cost function value is not below its threshold value.

Experiments were performed to compare the effectiveness, i.e., execution performance, executable code size, and compilation time of automatic inlining with user directed inlining. All measurements were performed using a prototype compiler with optimizations enabled, on an (trademark) IBM POWER2 Model 590 machine, running AIX. The only item permitted to vary from column to column is the amount of inlining that is performed. In the accompanying tables, the only differences between the measurements displayed in any two columns is the amount or method of inlining that was performed. The same preferred set of autoinline mode tunable parameters were used throughout the experiment. Our measurements were made on the Fortran subset of the SPECfp92 benchmarks as announced in, Technical report, Systems Performance Evaluation Cooperative, March 1992. *SPEC Newsletter* 4(1), Subra Balan and Walter Bays, editors, (except 047.tomcatv, which has no call sites). For an analysis of interprocedural aspects of the FORTRAN subset of the SPEC benchmarks, see Paul R. Carini and Michael Hind, Flow-Sensitive Interprocedural Constant Propagation, *SIGPLAN '95 Conference on Programming Language Design and Implementation*, pages 23–31, June, 1995, SIGPLAN Notices, 30(6). See also Michael Burke and Paul Carini, Compile-Time Measurements of Interprocedural Data-Sharing in FORTRAN Programs, RC 17389 76684, IBM—T. J. Watson Research Center, November 1991; and Michael Hind, Michael Burke, Paul Carini, and Sam Midkiff, An Empirical Study of Precise Interprocedural Array Analysis. *Scientific Programming*, 3(3):255–271, 1994. Note that since the current version of the prototype does not correctly compile the 013.spice2g6, 039.wave5, 089.su2cor, 093.nasa7, and 094.fpppp benchmarks with any form of inlining enabled, no results are available for these benchmarks. Results are presented for the remaining 6 SPECfp92 benchmarks. Note also that since userinline mode does not improve the execution performance of the 078.swm256 benchmark, we have used the non-inlined results for this benchmark to compute the userinline totals for the figures in this section. The results reported for userinline mode were obtained with the userinline options determined by a performance group at the (trademark) IBM Santa Teresa Development Laboratory. Profiling information was used as a starting point, and many experiments were conducted by the performance group to determine the best set of procedures that should be inlined in userinline mode for each program, in order to obtain the best possible performance. Since userinline mode does not improve the performance of the 078.swm256 benchmark, the non-inlined results have been used for this benchmark to compute the userinline totals for the figures in this section.

In each table, the first column, labeled "Program" lists the particular program of the FORTRAN subset of the SPEC benchmarks used for the test. The second column, labeled "Procedures", "Call Sites" or "Optimized", lists the characteristics of the program when no inlining is performed and the default optimization is used. The next two columns, labeled "Userinline" and "PCT", report the results obtained from userinline mode. The measurements are listed first; and the results are presented as a percentage of the no-inline column. In userinline mode the user selects the procedures that should be inlined. The last two columns, labeled "Autoinline" and "PCT" report the results obtained from our implementation of autoinline mode, again the measurements are presented first; and the results are presented as a percentage of the no-inline column.

Table 1 compares the number of procedures selected using the autoinline mode of the present invention with the number selected using userinline mode. The second column in Table 1, labeled "Procedures", lists the total number of procedures that are reachable from the main procedure in each program. The main procedure is not counted. Block Data subroutines are also excluded. The remaining columns list the number and percent of procedures inlined by each mode. The options for this mode were selected by an independent performance analysis team and are the result of a large number of experiments. These results reflect the best performance that can be obtained in this mode. The number of procedures that are inlined by the autoinline mode is much larger than the number of procedures specified in userinline mode, 49% to 20%, as expected.

TABLE 1

| | Number of Selected Procedures | | | | |
|---|---|---|---|---|---|
| PROGRAM | PROCE-DURES | USERIN-LINE | PCT | AUTOINLINE | PCT |
| 015.DODUC | 40 | 13 | 32 | 15 | 38 |
| 034.MDLJDP2 | 34 | 7 | 21 | 17 | 50 |
| 048.ORA | 1 | 1 | 100 | 1 | 100 |
| 077.MDLJSP2 | 34 | 7 | 21 | 17 | 50 |
| 078.SWM256 | 7 | * | 0 | 6 | 86 |
| 090.HYDRO2D | 39 | 3 | 8 | 20 | 51 |
| TOTAL | 155 | 31 | 20 | 76 | 49 |

Table 2 compares the number of call sites selected using the autoinline mode of the present invention with the number selected using userinline mode. The second column in Table 2, labeled "Call Sites" lists the total number of call sites in each program. The remaining columns list the number and percent of call sites inlined by each mode. The number of call sites that are expanded by the autoinline mode is much larger than the number expanded by userinline mode, 45% to 21%, but the difference is slightly smaller than the procedure difference. Autoinline mode chooses to inline 58 call sites of 15 procedures in 015.doduc, while 60 call sites of 13 procedures are inlined in userinline mode. This result clearly shows the call site specific nature of autoinline mode.

TABLE 2

| | Number of Selected Call Sites | | | | |
|---|---|---|---|---|---|
| PROGRAM | CALL-SITES | USERIN-LINE | PCT | AUTOINLINE | PCT |
| 015.DODUC | 110 | 60 | 55 | 58 | 53 |
| 034.MDLJDP2 | 124 | 15 | 12 | 34 | 27 |
| 048.ORA | 1 | 1 | 100 | 1 | 100 |
| 077.MDLJSP2 | 124 | 15 | 12 | 34 | 27 |
| 078.SWM256 | 18 | * | 0 | 17 | 95 |
| 090.RYDRO2D | 98 | 7 | 7 | 68 | 69 |
| TOTAL | 475 | 98 | 21 | 212 | 45 |

Table 3 compares the execution performance obtained from the autoinline mode of the present invention and userinline mode with the optimized execution performance of each benchmark. The second column in Table 3 lists the optimized execution performance of each benchmark. The reported measurements are in seconds, and correspond to the user time reported by the time command, in multi-user mode. Times that differ by 0.1 second are considered to be equivalent. Each execution was repeated in an effort to avoid cache effects. With the exception of the inline option, the same options were used in each mode (for each column) to facilitate a fair comparison. The highest level of optimization was used. The execution times reported here may not be the best that have been obtained by the prototype, but do provide a basis for comparing the performance of the different modes. The remaining columns list the execution performance observed with each mode. These measurements indicate that inlining provides measurable performance gains in the 6 benchmarks for which results have been obtained. Autoinline mode provides the same improvement as Userinline mode for the first 3 benchmarks, and provides better performance for the remaining three benchmarks: 077.mdljsp2, 078.swm256, and 090.hydro2d. The results in the totals column indicate that the improvement obtained by autoinline mode is 25% better than that achieved by userinline mode, a 2.1% versus a 1.6% improvement. The largest improvement, 6%, was obtained in 015.doduc.

TABLE 3

Execution Times

| PROGRAM | OPTI-MIZED | USERIN-LINE | PCT | AUTOINLINE | PCT |
|---|---|---|---|---|---|
| 015.DODUC | 18.4 | 17.2 | 93 | 17.3 | 94 |
| 034.MDLJDP2 | 31.7 | 31.2 | 98 | 31.3 | 99 |
| 048.ORA | 37.8 | 35.4 | 94 | 35.5 | 94 |
| 077.MDLJSP2 | 49.4 | 49.1 | 99 | 48.5 | 98 |
| 078.SWM256 | 73.3 | * | 100 | 72.6 | 99 |
| 090.HYDRO2D | 84.4 | 84.2 | 100 | 83.7 | 99 |
| TOTAL | 295.0 | 290.4 | 98.4 | 288.9 | 97.9 |

Table 4 compares the executable code size obtained from the autoinline mode of the present invention and userinline mode with the optimized executable code size of each benchmark. The second column in Table 4 lists the executable code size of the optimized binary for each benchmark. The measurements are reported in bytes, and are the total from the size command. The remaining columns list the executable code size obtained by the various modes. Both userinline and autoinline mode decrease the size of 3 of the 6 binaries; 2 become larger, and 1 essentially remains the same. The largest decrease in both userinline mode and autoinline mode is observed in 048.ora, and is 5% in both cases. The largest increase in both userinline and autoinline mode is observed in 015.doduc, and is 8% and 14%, respectively. The Total column shows that both userinline and autoinline modes have a negligible impact on object code size, with respective increases of 0.4% and 0.7%, respectively. To provide some perspective, the sum of the object code size of the first 4 benchmarks increases by 8% (from 612755 to 668075) when the optimization level is increased from O4 to O5, the highest level. Note that all but one of the call sites in 078.swm256 is expanded by the autoinline mode. If the remaining call site is also inlined, then the object code size decreases by 288 bytes, and the execution time increases by 0.2 seconds.

TABLE 4

Executable Code Size

| PROGRAM | OPTI-MIZED | USERIN-LINE | PCT | AUTOINLINE | PCT |
|---|---|---|---|---|---|
| 015.DODUC | 211930 | 228706 | 108 | 242258 | 114 |
| 034.MDLJDP2 | 241460 | 238134 | 99 | 237015 | 98 |
| 048.ORA | 10941 | 10349 | 95 | 10349 | 95 |
| 077.MDLJSP2 | 203744 | 199658 | 98 | 198519 | 97 |
| 078.SWM256 | 3729897 | * | 100 | 3728989 | 100 |
| 090.HYDRO2D | 696413 | 706245 | 101 | 712685 | 102 |
| TOTAL | 5094385 | 5112989 | 100.4 | 5129815 | 100.7 |

Table 5 compares the compilation times obtained from the autoinline mode of the present invention and userinline mode with the optimized executable code size of each benchmark. The second column in Table 5 lists the optimized compilation time in seconds for each benchmark. The remaining columns list the compilation times obtained by the various modes. Both userinline and autoinline mode increase the compilation time by 50%, as the totals indicate. The numbers clearly indicate that our implementation of autoinline mode does not have an additional compilation time cost above userinline mode.

TABLE 5

Compilation Times for the SPECfp92 Benchmarks

| PROGRAM | OPTI-MIZED | USERIN-LINE | PCT | AUTOINLINE | PCT |
|---|---|---|---|---|---|
| 015.DODUC | 209 | 460 | 220 | 346 | 165 |
| 034.MDLJDP2 | 60 | 50 | 83 | 89 | 148 |
| 048.ORA | 6 | 6 | 100 | 7 | 116 |
| 077.MDLJSP2 | 56 | 55 | 98 | 84 | 150 |
| 078.SWM256 | 27 | * | 100 | 26 | 96 |
| 090.HYDRO2D | 176 | 205 | 116 | 250 | 142 |
| TOTAL | 534 | 803 | 150.3 | 802 | 150.2 |

In summary, the experimental results demonstrate that the automatic inlining method of the present invention is more effective than user directed inlining. Automatic inlining mode provides a performance improvement which is equal or better than that which is obtained from user directed inlining for the Fortran subset of the SPECfp92 benchmarks. The executable code size showed a negligible increase and remained comparable both to those obtained by userinline mode on these benchmarks, and to the optimized code size. The compilation time cost for autoinline mode remained the same as the compilation time for userinline mode, both of which are 50% longer than the optimized mode.

While the invention has been described in terms of a preferred embodiment, those skilled in the art will recognize that the invention can be practiced with modification within the spirit and scope of the appended claims.

I claim:

1. In a computer processor executing a computer compiler, a compiler implemented method for performing selective automatic procedure integration over a program call graph (PCG), comprising the steps of:

constructing the PCG of a computer program, the PCG having a plurality of PCG nodes and PCG edges, each PCG node representing a procedure in the computer program and each PCG edge representing a call site connecting two nodes, each call site being a statement in a program that invokes a given procedure, a source node being a calling PCG node and a PCG edge having a direction from the calling node to a called node, so that an outgoing PCG edge represents a call site within said procedure and an incoming edge represents a call site invoking said procedure from within another procedure, wherein the PCG edge may further represent a back edge;

eliminating from processing any back edges of the PCG;

collecting a plurality of parameter values for use by a routine cost function which characterizes the suitability of each procedure for inlining, and by a call site cost function which characterizes the suitability of each PCG edge for inlining;

performing the following steps for each procedure P in a reverse topological traversal of the PCG:

inlining each outgoing PCG edge that has been marked to be inlined;

evaluating the routine cost function which utilizes a first portion of said plurality of parameter values associated with the procedure P;

evaluating the call site cost function which utilizes a second portion of said plurality of parameter values associated with each PCG edge; and marking for inlining each incoming PCG edge for which the routine cost function is evaluated less than a first threshold value and the call site cost function is evaluated less than a second threshold value.

2. The method of claim 1, further comprising the step of refining said plurality of parameter values by interprocedural constant propagation which increases the number of constant arguments within the program, responsive to said collecting step.

3. The method of claim 1, wherein said plurality of parameter values includes a size of each procedure; and wherein the routine cost function is directly proportional to said size.

4. The method of claim 1, wherein said plurality of parameter values includes a control flow complexity of each procedure; and wherein the routine cost function is directly proportional to said control flow complexity.

5. The method of claim 1, wherein said plurality of parameter values includes a call count of each procedure; and wherein the routine cost function is directly proportional to said call count.

6. The method of claim 1, wherein said routine cost threshold value is increased when the procedure is a leaf procedure.

7. The method of claim 1, wherein said plurality of parameter values includes a block size associated with each PCG edge; and wherein the call site cost function is directly proportional to said block size.

8. The method of claim 1, wherein said plurality of parameter values includes a count of execution paths which may not traverse the call site; and wherein the call site cost function is directly proportional to said count of execution paths.

9. The method of claim 1, wherein said plurality of parameter values includes a loop nesting level associated with each PCG edge; and wherein the call site cost function is inversely proportional to said loop nesting level.

10. The method of claim 1, wherein said collecting step comprises recognizing when at least one of said plurality of parameter values is used to determine a control flow within the procedure.

11. The method of claim 10, comprising the step of increasing said routine cost threshold value, responsive to said recognizing.

12. The method of claim 10, comprising the step of increasing said call site cost threshold value when the call site is associated with the parameter value used to determine the control flow, responsive to said recognizing.

13. The method of claim 9, comprising the step of increasing the call site threshold value in direct proportion to the loop nesting level, responsive to said determining a loop nesting level.

14. In a computer processor executing a computer compiler, a compiler implemented method for performing selective automatic procedure integration over a program call graph (PCG), comprising the steps of:

constructing the PCG of a computer program, the PCG having a plurality of PCG nodes and PCG edges, each PCG node representing a procedure in the computer program and each PCG edge representing a call site connecting two nodes, each call site being a statement in a program that invokes a given procedure, a source node being a calling PCG node and a PCG edge having a direction from the calling node to a called node, so that an outgoing PCG edge represents a call site within said procedure and an incoming edge represents a call site invoking said procedure from within another procedure, wherein the PCG edge may further represent a back edge;

eliminating from processing any back edges of the PCG;

collecting a plurality of parameter values for use by a routine cost function which characterizes the suitability of each procedure for inlining, and by a call site cost function which characterizes the suitability of each PCG edge for inlining;

wherein the routine cost function is directly proportional to a first portion of said plurality of parameter values including: a size of each procedure; a control flow complexity; and a call count;

wherein the call site cost function is directly proportional to a second portion of said plurality of parameter values including: a block size and a loop nesting level associated with each PCG edge; and a count of execution paths which may not traverse the call site;

performing the following steps for each procedure P in a reverse topological traversal of the PCG:

inlining each outgoing PCG edge that has been marked to be inlined;

evaluating the routine cost function for the procedure P;

evaluating the call site cost function for each PCG edge; and marking for inlining each incoming PCG edge for which the routine cost function is evaluated less than a first threshold value and the call site cost function is evaluated less than a second threshold value, responsive to said evaluating.

15. A program storage device readable by a computer processor, tangibly embodying a computer program executable by the computer processor to perform a compiler implemented method for performing automatic procedure integration over a program call graph (PCG), said method comprising the steps of:

constructing the PCG of the computer program, the PCG having a plurality of PCG nodes and PCG edges, each PCG node representing a procedure in the computer program and each PCG edge representing a call site connecting two nodes, each call site being a statement in a program that invokes a given procedure, a source node being a calling PCG node and a PCG edge having a direction from the calling node to a called node, so that an outgoing PCG edge represents a call site within said procedure and an incoming edge represents a call site invoking said procedure from within another procedure, wherein the PCG edge may further represent a back edge;

eliminating from processing any back edges of the PCG;

collecting a plurality of parameter values for use by a routine cost function which characterizes the suitability of each procedure for inlining, and by a call site cost function which characterizes the suitability of each PCG edge for inlining;

performing the following steps for each procedure in a reverse topological traversal of the PCG:

inlining each outgoing PCG edge that has been marked to be inlined;

evaluating the routine cost function which utilizes a first portion of said plurality of parameter values associated with the procedure P;

evaluating the call site cost function which utilizes a second portion of said plurality of parameter values associated with each PCG edge; and    marking for inlining each incoming PCG edge for which the routine cost function is evaluated less than a first threshold value and the call site cost function is evaluated less than a second threshold value.

16. The program storage device of claim 15, further comprising the step of refining said plurality of parameter values by interprocedural constant propagation for increasing the number of constant arguments within the program, responsive to said collecting step.

17. The program storage device of claim 15, wherein said plurality of parameter values includes a size of each procedure; and wherein the routine cost function is directly proportional to said size.

18. The program storage device of claim 15, wherein said plurality of parameter values includes a control flow complexity of each procedure; and wherein the routine cost function is directly proportional to said control flow complexity.

19. The program storage device of claim 15, wherein said plurality of parameter values includes a call count of each procedure; and wherein the routine cost function is directly proportional to said call count.

20. The program storage device of claim 15, wherein said routine cost threshold value is increased when the procedure is a leaf procedure.

21. The program storage device of claim 15, wherein said plurality of parameter values includes a block size associated with each PCG edge; and wherein the call site cost function is directly proportional to said block size.

22. The program storage device of claim 15, wherein said plurality of parameter values includes a count of execution paths which may not traverse the call site; and wherein the call site cost function is directly proportional to said count of execution paths.

23. The program storage device of claim 15, wherein said plurality of parameter values includes a loop nesting level associated with each PCG edge; and wherein the call site cost function is inversely proportional to said loop nesting level.

24. The program storage device of claim 23, comprising the step of increasing the call site threshold value in direct proportion to the loop nesting level, responsive to said step of determining a loop nesting level.

25. The program storage device of claim 15, wherein said collecting step comprises recognizing when the parameter value is used to determine a control flow within the procedure.

26. The program storage device of claim 25, comprising the step of increasing said routine cost threshold value, responsive to said step of recognizing.

27. The program storage device of claim 25, comprising the step of increasing said call site cost threshold value when the call site is associated with the parameter value used to determine the control flow, responsive to said step of recognizing.

* * * * *